United States Patent [19]

Kanamaru et al.

[11] Patent Number: 5,562,560
[45] Date of Patent: Oct. 8, 1996

[54] SPEED REDUCING APPARATUS HAVING WOBBLING ROTATION PLATE

[76] Inventors: Hisanobu Kanamaru, 3449-7, Higashiishikawa; Kouji Harada, 467, Tabiko, both of Katsuta-shi, Ibaraki 312; Masaharu Okazaki, 3234, Oosato, Kanasago-mura, Kuji-gun, Ibaraki 313-10, all of Japan

[21] Appl. No.: 923,454

[22] Filed: Aug. 3, 1992

[30] Foreign Application Priority Data

Aug. 8, 1991 [JP] Japan .................................. 3-199626

[51] Int. Cl.⁶ .................................................. F16H 23/10
[52] U.S. Cl. .................................................. 475/163; 74/60
[58] Field of Search .................................. 74/60; 475/163, 475/164

[56] References Cited

U.S. PATENT DOCUMENTS

| | | | |
|---|---|---|---|
| 871,240 | 11/1907 | Schoedelin | 475/163 |
| 1,671,496 | 5/1928 | Trumpler | 475/163 |
| 1,748,907 | 2/1930 | Vallance | 475/163 |

FOREIGN PATENT DOCUMENTS

| | | | |
|---|---|---|---|
| 59-6451 | 1/1984 | Japan | 475/163 |
| 60-136642 | 7/1985 | Japan | 475/163 |
| 2-304236 | 12/1990 | Japan . | |

*Primary Examiner*—Allan D. Herrmann

[57] ABSTRACT

A speed-reducing apparatus of low mechanical noise is disclosed which includes a wobbling rotation plate. In the speed-reducing apparatus, a fixed plate and a wobbling rotation plate face each other at a rotation angle and a rotation phase difference and are gradually engaged together with an output shaft.

11 Claims, 4 Drawing Sheets

SPEED REDUCING APPARATUS HAVING WOBBLING ROTATION PLATE

BACKGROUND AND SUMMARY OF THE INVENTION

The present invention relates to a general-purpose speed-reducing apparatus of high speed reduction ratio. Certain preferred embodiments relate to a speed-reducing apparatus for quietly driving an elevator at a high efficiency.

A speed-reducing apparatus of high reduction ratio was known, for example, in the Japanese Patent Laid-Open Patent Document 2304236.

The prior apparatus is constructed with a crankshaft having a pair of bearing supports which are eccentric to each other. The bearing supports have peripherally spheric bearings of the same size mounted thereon and each of the peripherally spheric bearings has wobbler gear fitted therein as a shaft.

The apparatus of such a type operates as follows. The crankshaft is rotated, the peripherally spheric bearing is revolved to wobble. This makes the first and second gears cycloid-move on the third and fourth gears with which they engage. The output shaft rotation is then reduced at a ratio of tooth number difference of the engaged gears to the rotational frequency of the motor.

The prior speed-reducing apparatus described above has a disadvantage that its cycloid movement involves high engagement slip and low accuracy of the component assembling as engagement is of a curve with a sphere or cylinder. This results in high mechanical noise. It also has another disadvantage in that it is difficult to machine and assemble the many complicated component parts used.

In view of the foregoing, it is an object of the present invention to provide a speed-reducing apparatus having a wobbling rotation plate wherein a speed-reducing mechanism of low mechanical noise is used.

Another object of the present invention is to provide a speed-reducing apparatus having a wobbling rotation plate wherein simple component parts can be easily machined and assembled to a speed-reducing mechanism.

Briefly, the foregoing objects are accomplished in accordance with preferred embodiments of the present invention by a speed-reducing apparatus having a fixed plate and a wobbling rotation plate facing the fixed plate. The fixed plate and the wobbling rotation plate have interengageable portions which effect a reduced speed rotation of the wobbling rotation plate with respect to an input shaft which drives an inclined plate slidably engaging the rotation plate to impart wobbling movement. The fixed plate and wobbling rotation plate are operatively connected together in the axial direction by the interengageable portions thereof.

Upon rotation of the input shaft, an inclined plate carried by the input shaft slidably engages the wobbling rotation plate so that the wobbling rotation plate is sequentially inclined. Drive pin guide holes in the wobbling rotation plate engage with drive pins at the fixed plate so that the wobbling rotation plate is sequentially moved in the input shaft rotation direction at a predetermined reduced rotational speed. A semi-spherical protrusion at the output shaft serves to center the wobbling rotation plate. Thus, the wobbling rotation plate is rotated at a predetermined reduced speed as it is forced into wobbling movement by the input shaft inclined plate. A rotation torque is transmitted from the wobbling rotation plate to output shaft drive pins carried by the output shaft.

Embodiments are also contemplated wherein the wobbling rotation plate and fixed plate are operatively connected to transfer torque by other than interengaging pin and holes. For example, the peripheral edge of the wobbling rotation plate and the fixed plate are provided with respective friction surfaces that engage one another as the wobbling plate rotates around the fixed plate due to the wobbling motion imparted by the input shaft inclined plate slidably engaging the wobbling rotation plate.

Other objects, advantages and novel features of the present invention will become apparent from the following detailed description of the invention when considered in conjunction with the accompanying drawings.

DETAILED DESCRIPTION OF THE DRAWINGS

Figure 1:
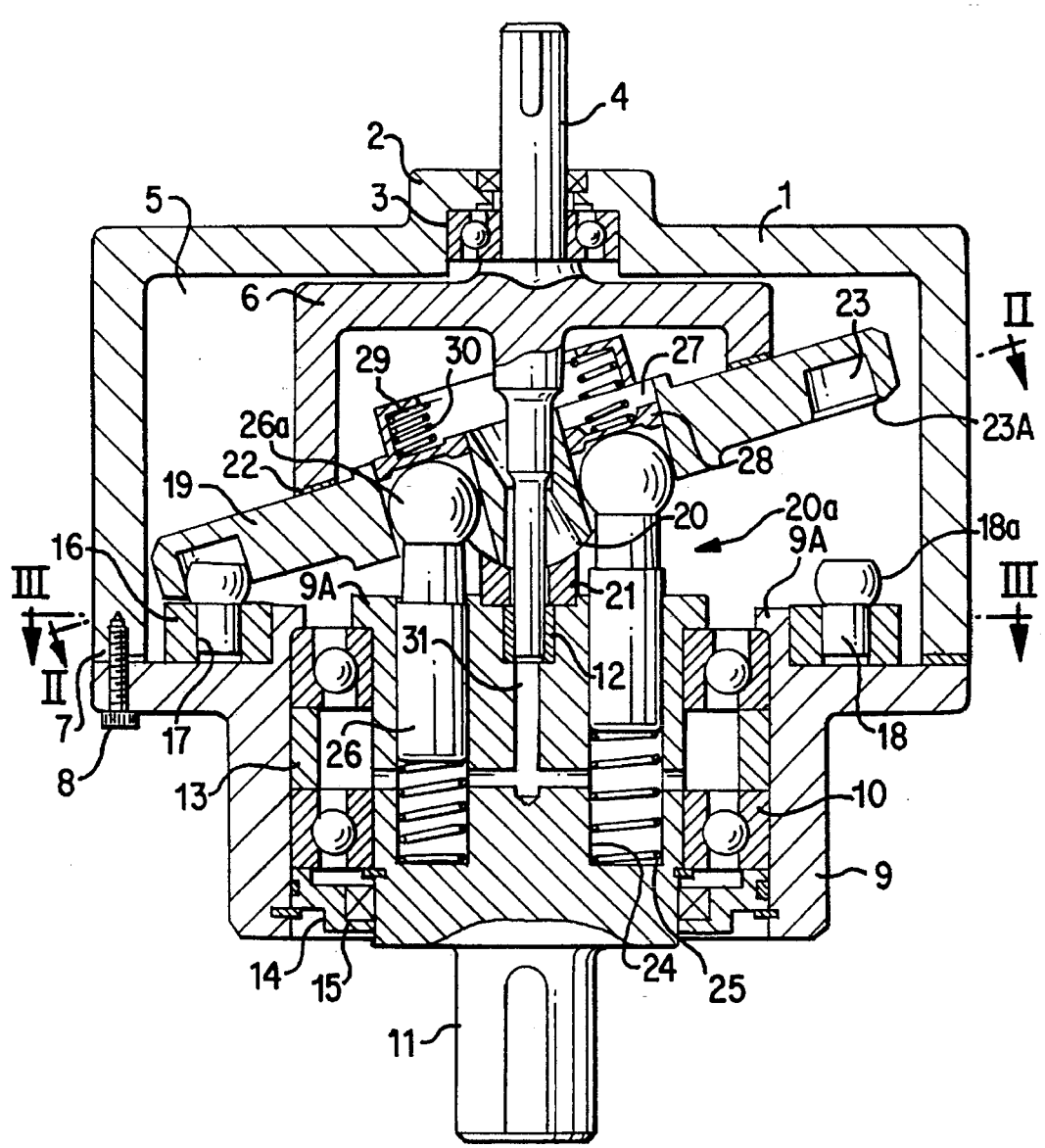
FIG. 1 is a longitudinal cross-sectional view of a speed reducing device constructed according to a preferred embodiment of the present invention.

FIG. 1 is a longitudinal cross-sectional view of an embodiment of the present invention for an oscillation speed-reducing apparatus. A first housing 1 construction as a pot-shaped metal body has an end of an input shaft 4 supported in a bearing 3 at a center portion 2 thereof. The input shaft 4 has a cylinder-shaped inclined plate 6 integrated together in an inside space 5 of the first housing 1. The other end of the input shaft 4 is rotatably supported through a bearing 12 with a center of an output shaft 11. The output shaft 11 is rotatably supported by bearings 10 inside of a cylinder-shaped second housing 9 fixed to an opening of the first housing 1 by means of a seal 7 and screws or bolts 8.

Outer races of the bearings 10 are arranged in parallel in an axial direction of the input shaft 4 and are fixed in the inside of the second housing 9 with a spacer 13 and a holding ring 14 so as not to move in the axial direction. Similarly, the inner races of the bearings 10 are fixed in the outside of the output shaft 11 so as not move in the axial direction. The output shaft 11 is sealed by a shaft seal 15.

Figure 3:
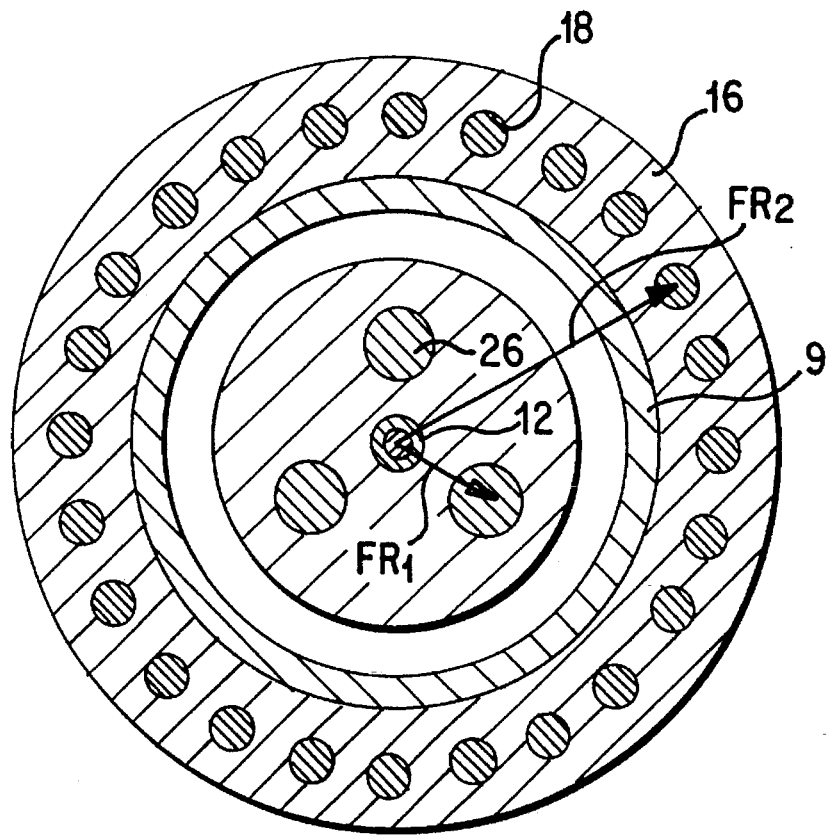
FIG. 3 is a sectional view taken along section line III—III of FIG. 1.

The second housing 9 has a ring-shaped pin mounting plate 16 concentrically fixed at one extension 9A in the inside wall thereof. The pin mounting plate 16, as shown in FIG. 3, has a plurality of pin mounting holes 17 arranged concentrically around its center near the outer circumference thereof. Each of the pin mounting holes 17 has a speed-reducing pin 18 pressed therein. The pin mounting plate 16 and the speed-reducing pins 18 together form a force transfer member. Each speed-reducing pin 18 has a spherical head 18a which is abrasion resistant and preferably made of hardened steel. The heads 18a are cut off at the top side as shown in FIG. 1 to thereby limit their length while leaving a sufficient effective length.

A wobbling rotation plate 19 is penetrated by the input shaft 4. The center portion of wobbling rotation plate 19 has a semi-spherical protrusion 20. A retainer 21 is fixed at a center portion of the output shaft 11 facing the protrusion 20. The wobble member 19 and the output shaft 11 are connected by a universal joint connection 20a. The rear side (top side in FIG. 1) of the wobbling rotation plate 19 is always inclined with continuous contact with the inclined plate 6 through a sliding member 22 of synthetic resin or the like. Pin guide holes 23 are formed at an outer circumferential portion of wobbling rotation plate 19 at the side facing the speed-reducing pins 18. The pin guide holes 23 are cylindrical holes having virtually the same diameter as the heads of the speed-reducing pins 18. The opening edges 23A of pin guide holes 23 are chamfered as illustrated in FIG. 1. The number of the pin guide holes 23 is equal to the number of the speed reducing pins 18 plus one, that is, there will be n+1 pin guide holes and n speed reducing pins 18. The bottoms of the pin guide holes 23 are closed off or blind in order to increase the rigidity of the wobbling rotation plate 19. However, embodiments are contemplated with through holes 23 with corresponding structural rigidity of the rotation plate.

Figure 2:
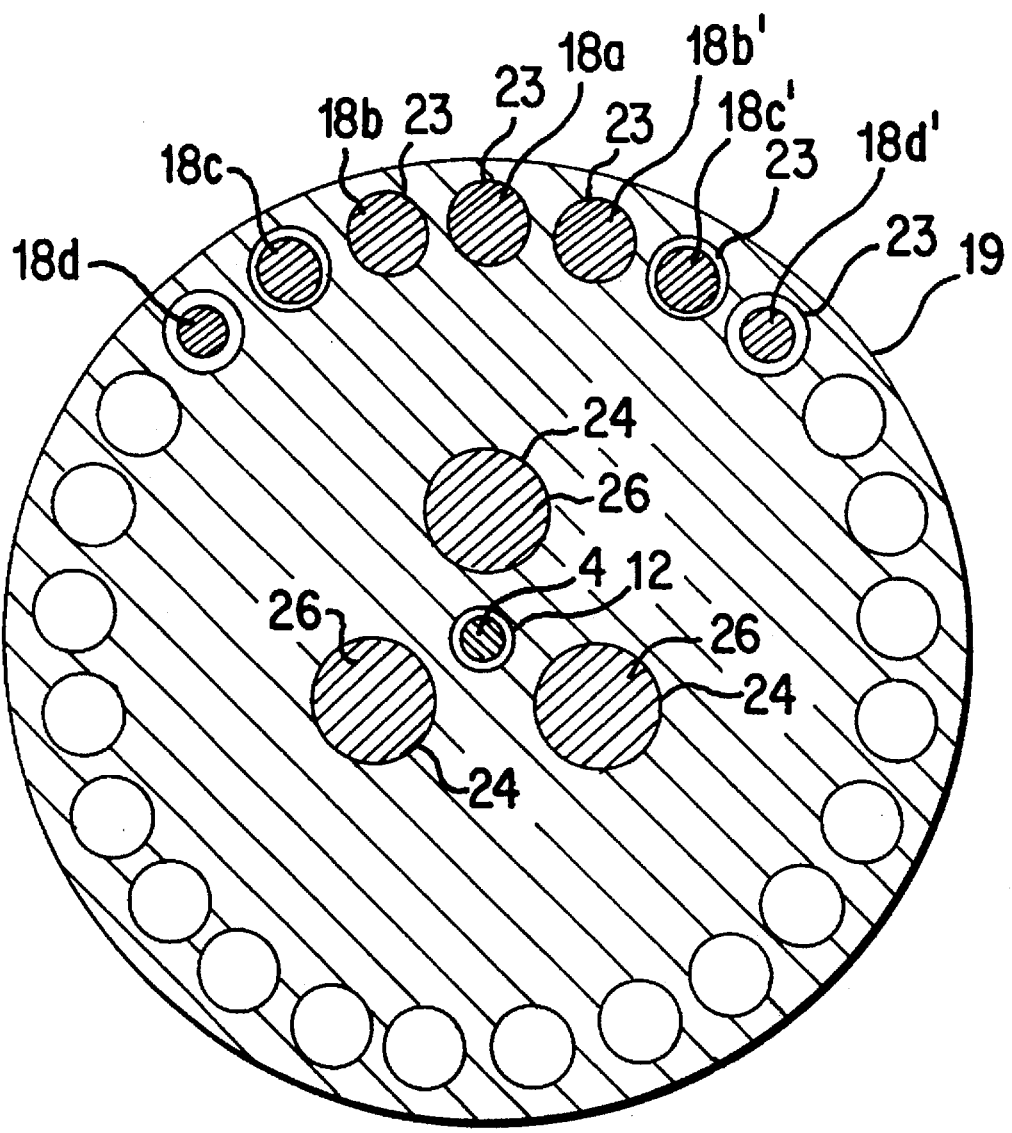
FIG. 2 is a sectional view taken along section line II—II of FIG. 1.

The transmission device of FIGS. 1–3 operates as follows. As shown in FIGS. 1 and 2, the output shaft 11 has three insertion holes 24 extending in parallel with its center axis concentrically provided at equal intervals of 120 degrees. Each of the insertion holes 24 accommodates an axially movable drive pin 26 having a spherical head 26a at one end and a compression spring 25 at the other end for biasing the drive pin 26 towards the wobbling rotation plate 19 into respective insertion holes 27 provided on the wobbling rotation plate 19. Compression springs 30 are provided between respective movable spring retainers 28 and spring retainers 29 fixed on the wobbling rotation plate 19. The spring forces of the compression springs 25 and compression springs 30 are virtually equal although the output side springs 30 may be weaker by around 30%. This spring support arrangement balances the drive pins 26 to be always biased in a floating state towards their respective center positions. The output shaft 11 has a lubricating oil channel 31 provided in the center portion thereof communicating between the bearing 12 and the insertion holes 24. The lubricating oil channel 31 can supply lubricating oil filled in the inside space 5 to sliding parts.

In the construction described above, it is preferable to have drive pins 26 spaced equally and concentrically as shown in FIG. 2. The preferred number of drive pins 26 is three or more. If the number is even, they should be equally spaced as pairs. The spherical heads 26a have a predetermined size depending on the required strength. The spherical heads 26a are also hardened together with the axial portion of pins 26 as needed. Spherical heads 26a are further coated with titanium coating or the like with materials being properly selected to accommodate the operational loads and friction sliding forces.

In the construction described above, the inclined plate 6 is rotated by the input shaft 4. Rotation of inclined plate 6 makes the wobbling rotation plate 19 start conical wobbling motion. The incline plate 6 acts as an engaging member. This conical motion in turn moves the engagement point of the speed-reducing pins 18 with the pin guide holes 23 sequentially in the rotation direction with the protrusion 20 centered. Thus, the wobbling rotation plate 19 rotates about the centrally disposed semi-spherical protrusion 20 while wobbling substantially.

The rotation torque is transmitted from the wobbling rotation plate 19 to the drive pins 26 with a reduction in the rotational speed of the output shaft 11. With the input shaft 4 rotated, the compression springs 25 and the compression springs 30 are gradually changed from the maximum compression to the minimum reciprocally depending on the inclination of the wobbling rotation plate 19. All three of the drive pins 26 transmit the rotation drive force to the output shaft 11. The drive pins 26 are continuously movable axially about their central position and the spherical heads 26a are always moved on a concentric track to form a constant-speed reduction transmission device. This is because the compression springs 25 and the compression springs 30 are always balanced in the compression pressures.

Referring to FIG. 2, at any given point in the rotation of the input shaft and "wobbling" of the plate 19, a plurality of pins 18a, b, c . . . a', b', c', are at least partly engaged in respective pin guide holes 23. As seen in FIG. 2, the upper center pin 18a is fully engaged while the circumferentially spaced pins 18b, 18b' . . . are partially engaged.

Figure 4:
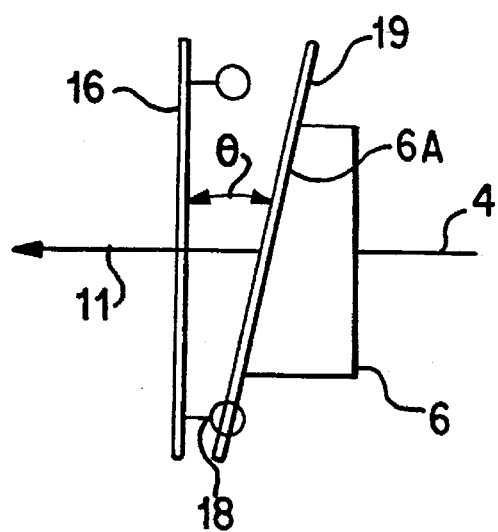
FIG. 4 is a schematic view illustrating principles of operation of preferred embodiments of the present invention.

The operation of the speed-reducing transmission device of the present invention is schematically depicted in FIG. 4. The pin mounting plate 16 and the wobbling rotation plate 19 face each other with an inclination angle θ and a rotation phase angle. Plates 16 and 19 are engaged together in the axial direction through the speed reducing pins 18 and holes 23. The inclination angle θ is determined to a desired degree by inclining an end face 6A of the inclined plate 6 which slidably engages the wobbling rotation plate. The speed reduction ratio of the transmission device is related to the magnitude of the inclination angle θ under the following formula:

$$\cos\theta = \frac{R}{R+1}$$

Thus for the example given the above described embodiment and with a speed reduction ratio of 15 to 1, $$(R=15), \cos\theta = \frac{15}{15+1} = 15/16.$$

Speed reduction ratios R of between 10 and 200 are contemplated for practical embodiments of the invention, because of practical limitations in the tilt angle θ that can be efficiently used due to expected rotational and sliding forces.

In accordance with the above-described embodiment of FIG. 1, the pin mounting plate 16 and the wobbling rotation plate 19 can be engaged together without circumferential bearing support due to the sequential but continuous force transfer engagement in the axial direction with the part spherical sections of pins 18A and the chamfered holes 23. This construction reduces mechanical noises to a great extent as compared to conventional gear drive speed reduction transmission. Also, the engagement points at the pin mounting plate 16 and wobbling rotation plate 19 are very advantageous in view of machining and productivity because of the simple configuration.

Further, the torque transfer capacity can be made high as a desired number of engaging pins and holes can be selected. An increase in the number of pins and holes will improve the smoothness of the torque transfer and thus the resulting reduction in noise generated. On the other hand, an increase in the number pins and holes will increase the manufacturing costs, especially considering the precision required to assure proper sequential engagement of n speed reducing pins 18 with n+1 holes 23. For example, precise dimensioning of these parts would be required to assure that the pins and holes mate as desired during high speed operation. For lower torque transfer applications, the holes and pins could be dispensed with and with force transfer only by way of annular friction surfaces of the wobbling plate and fixed plate.

The speed-reducing transmission device according to the present invention can also be made relatively compact as compared to gear systems transmitting equivalent torque.

Furthermore, the speed-reducing apparatus of the present invention securely provides a high mechanical efficiency as it virtually has no sliding portions.

Figure 5:
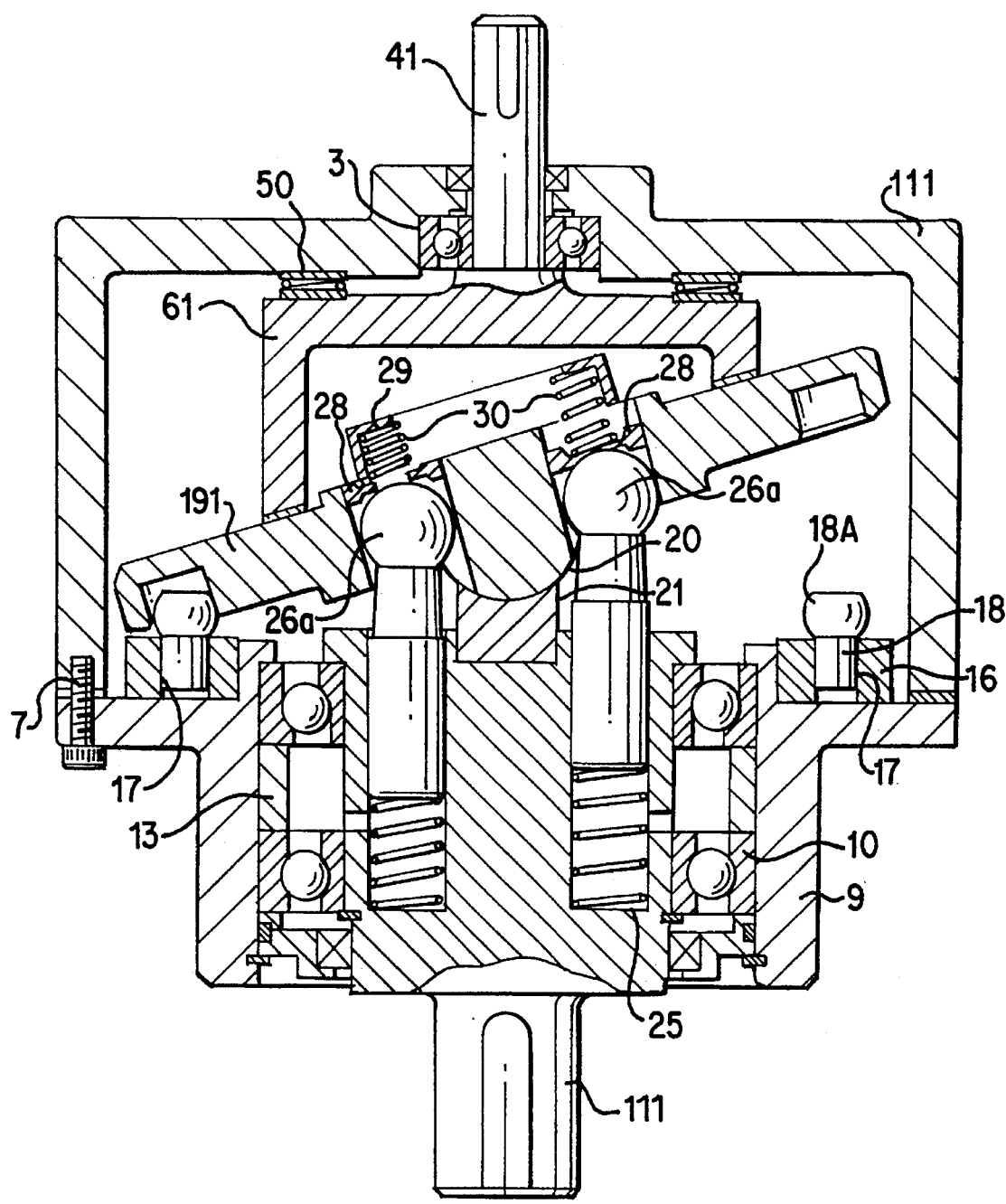
FIG. 5 is a longitudinal cross-sectional view similar to FIG. 1, but showing another preferred embodiment of the present invention.

The embodiment of FIG. 5 is different from the preceding embodiment shown in FIG. 1 in that an input shaft 41 is not supported on an output shaft 111 through a wobbling rotation plate 191. As this construction makes the input shaft 41 unstable, a rear side of the cylindrical inclining plate 61 has to be supported on a first housing 111 through a thrust bearing 50 as shown in the figure.

In the embodiments described above, since the speed-reducing pins 18 are pressed in the pin mounting plate 16, they can be replaced easily to maintain precision when they become abraded. Alternatively, the pin guide holes 23 can be shaped as indentations in an annular groove or as through openings in an annular portion of the wobbling rotation plate.

In the case of through openings, it is preferable to make their opening width narrower than the diameter of the spherical heads 18a of the speed-reducing pins for reasons of desired mechanical strength.

For practical applications, the relative radial positioning of the drive pins 26 and speed reducing pins 18 (radius $FR_1$ and $FR_2$ in FIG. 2) is such that $\frac{1}{4} FR_1 < R_1 < \frac{1}{2} FR_2$.

While the principles of the present invention have been described above in connection with specific embodiments, the output shaft can be driven as the input shaft to change the apparatus to a speed-increasing apparatus. Output power can then be taken from the input shaft shown in the drawings.

The present invention provides a speed-reducing apparatus having a wobbling rotation plate of low mechanical noise with operation of the speed-reducing mechanism such that the fixed plate and the wobbling rotation plate are rotated relatively to one another while being gradually engaged together in the axial direction.

Also, the present invention provides a speed-reducing apparatus that is made of simple component parts with use of the wobbling rotation plate having the speed-reducing mechanism that can be easily machined and assembled.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A speed-reducing apparatus comprising:

an input shaft and an output shaft arranged along a single axis;

a wobbling rotation plate arranged so as to wobble while rotating around said single axis depending on rotation of said input shaft;

an inclined plate inclining against and fixedly mounted on said input shaft, said inclined plate engaging with said wobbling rotation plate for driving said wobbling rotation plate for driving said wobbling rotation plate to wobble while rotating;

a support portion provided on said single axis for supporting a central portion of said wobbling rotation plate on said output shaft while allowing said wobbling rotation plate to wobble around said support portion;

a rotation transmission mechanism that transmits revolving power of said wobbling rotation plate to said output shaft, said rotation transmission mechanism including at least three drive pins arranged symmetrically with respect to said single axis, each of said pins having an end thereof inserted in a hole of said wobble rotation plate and the other end thereof slidably inserted in a hole of said output shaft;

and speed-reducing pins arranged fixedly relative to said input shaft and said output shaft at regular intervals, wherein said wobbling rotation plate engages with the speed-reducing pins in the axial direction depending on the rotation thereof in a way that an engaging point moves gradually as it rotates.

2. A speed-reducing apparatus having wobbling rotation plate according to claim 1, wherein the engagement of the speed-reducing pins with the wobbling rotation plate is made by n pieces of the speed-reducing pins and the wobbling rotation plate has (n+1) pin guide holes or grooves.

3. A speed-reducing apparatus according to claim 2, wherein each of the speed-reducing pins has a spherical surface and is continuously engaged with a plurality of the pin guide holes or the grooves of the wobbling rotation plate.

4. A speed-reducing apparatus according to claim 3, wherein the speed-reducing pins are pressed in the pin mounting plate to facilitate replacement.

5. A speed-reducing apparatus according to claim 4, wherein the speed-reducing pins are fixed on a housing through a pin mounting plate.

6. A speed-reducing apparatus comprising:

a housing;

an input shaft and an output shaft arranged along a single axis and supported on said housing;

a wobbling rotation plate arranged in said housing so as to wobble while rotating around said single axis depending on rotation of said input shaft;

a cylindrical inclined plate integrated with said input shaft and engaging with said wobbling rotation plate for driving said wobbling rotation plate so as to wobble while rotating;

a support portion provided on said single axis for supporting a central portion of said wobbling rotation plate on said output shaft while allowing said wobbling rotation plate to wobble around said support portion;

a rotation transmission mechanism that transmits revolving power of said wobbling rotation plate to said output shaft, said rotation transmission mechanism including at least three drive pins arranged symmetrically with respect to said single axis, each of said pins having a spherical head at one end thereof inserted in a hole of said wobble rotation plate and straight portion at the other end slidably inserted in a hole of said output shaft;

speed-reducing pins fixedly arranged in a plane at regular intervals, wherein said wobbling rotation plate engages with the speed-reducing pins in the axial direction depending on rotation thereof such that an engaging point moves gradually as it rotates.

7. A speed-reducing apparatus according to claim 6, wherein the input shaft and is rotatably supported on the output shaft through the wobbling rotation plate.

8. A speed-reducing apparatus according to claim 6, wherein the input shaft is integrated with a cylindrical inclined plate, and the cylindrical inclined plate is supported on inside walls of the output shaft through a thrust bearing.

9. A speed-reducing apparatus according to claim 7, wherein the housing has lubricating oil filled therein.

10. A device for transmitting rotational forces with a speed reduction comprising:

a wobble member, a force transfer member engageable with the wobble member for transferring rotational forces therebetween, and an engaging member slidably engageable with the wobble member to thereby move the wobble member as a function of the rotational position of the engaging member and cause the wobble member to engage the force transfer member and apply rotational forces thereto;

an input shaft connected to be rotatable together with one of the wobble member, the force transfer member, and the engaging member;

an output shaft connected to be rotatable together with another one of the wobble member, the force transfer member, and the engaging member;

wherein said input shaft and output shaft are axially aligned on a common rotational axis;

wherein said input shaft is connected to be rotatable with the engaging member;

wherein said output shaft is connected to be rotatable together with the wobble member;

wherein said force transfer member is fixedly connected to a housing which rotatably supports the input shaft and output shaft;

and comprising a universal joint connection between the wobble member and the output shaft:

wherein the universal joint connection includes a spherical ball joint connector at a common axis of the wobble member and the output shaft and at least three elastically loaded drive pins disposed symmetrically around the common axis.

11. A device for transmitting rotational forces with a speed reduction comprising:

a wobble member, a three transfer member engageable with the wobble member for transferring rotational forces therebetween, an engaging member slidably engageable with the wobble member to thereby move the wobble member as a function of the rotational position of the engaging member and cause the wobble member to engage the force transfer member and apply rotational forces thereto;

and a transmission device housing including a first housing part and a second housing part detachably connected with one another and surrounding the force transfer member and wobble member;

wherein said force transfer member is fixed relative to the housing;

wherein the engaging member is an inclined plate carried by a rotatable input shaft for rotation about a centrally disposed rotational axis;

wherein the force transfer member is a relatively fixed member extending annularly around the rotational axis;

wherein the wobble member is configured to sequentially engage different circumferential portions of the force transfer member during this wobbling movement;

wherein said force transfer member includes a plurality of speed reducing pins which are engageable with discrete parts extending annularly around the wobble member;

further comprising a universal joint connection between the wobble member and an output shaft;

wherein the universal joint connection includes a spherical ball joint connector at a common axis of the wobble member and the output shaft and at least three elastically loaded drive pins disposed symmetrically around the common axis.

* * * * *